United States Patent [19]

Fararooy

[11] Patent Number: 5,136,459
[45] Date of Patent: Aug. 4, 1992

[54] HIGH SPEED CURRENT LIMITING SYSTEM RESPONSIVE TO SYMMETRICAL & ASYMMETRICAL CURRENTS

[75] Inventor: Pedram Fararooy, Los Angeles, Calif.

[73] Assignee: Electric Power Research Institute, Inc., Palo Alto, Calif.

[21] Appl. No.: 322,663

[22] Filed: Mar. 13, 1989

[51] Int. Cl.⁵ .............................................. H02H 3/26
[52] U.S. Cl. ........................................ 361/93; 361/94; 364/483
[58] Field of Search ................. 361/87, 93, 94, 95, 361/96, 97; 364/483

[56] References Cited

U.S. PATENT DOCUMENTS

4,814,935  3/1989  Arinobu et al. ................... 361/96
4,827,369  5/1989  Saletta et al. ..................... 361/96

Primary Examiner—A. D. Pellinen
Assistant Examiner—S. Jackson

[57] ABSTRACT

A method for initiating a rapid current limiting device utilizing a device which integrates the current during a selected time interval. The equivalent RMS is predicted based on the integration to generate a signal which initiates the current limiting device when the predicted RMS current exceeds a preselected value.

4 Claims, 10 Drawing Sheets

HIGH SPEED CURRENT LIMITING SYSTEM RESPONSIVE TO SYMMETRICAL & ASYMMETRICAL CURRENTS

BACKGROUND OF THE INVENTION

1. Field of The Invention

The invention relates to protection systems and more specifically to current limiting systems responsive to both Symmetrical and Asymmetrical currents.

2. DESCRIPTION OF THE PRIOR ART

A typical prior art system for rapidly responding to Symmetrical and Asymmetrical currents is disclosed in U.S. Pat. No. 4,443,854, issued to Herbert M. Pflanz and assigned to the same assignee as current application. In the Pflanz application, the integral of Current was compared to known signals indicating whether or not the current was symmetrical or asymmetrical and different trigger points utilized depending on whether the current was symmetrical or asymmetrical.

SUMMARY OF THE INVENTION

The present invention provides a method for initiating a rapid current limiting device. More specifically, the present invention integrates the current signal between first and second preselected time intervals. The value of the resulting integration and the instantaneous value of current at that time are used to predict the Equivalent RMS current and the fast current limiting device is initiated if the RMS value of current is higher than a preset threshold. Additionally, the prediction is made using predetermined mathematical criteria and digital look-up techniques.

DETAILED DESCRIPTION

Figure 1:
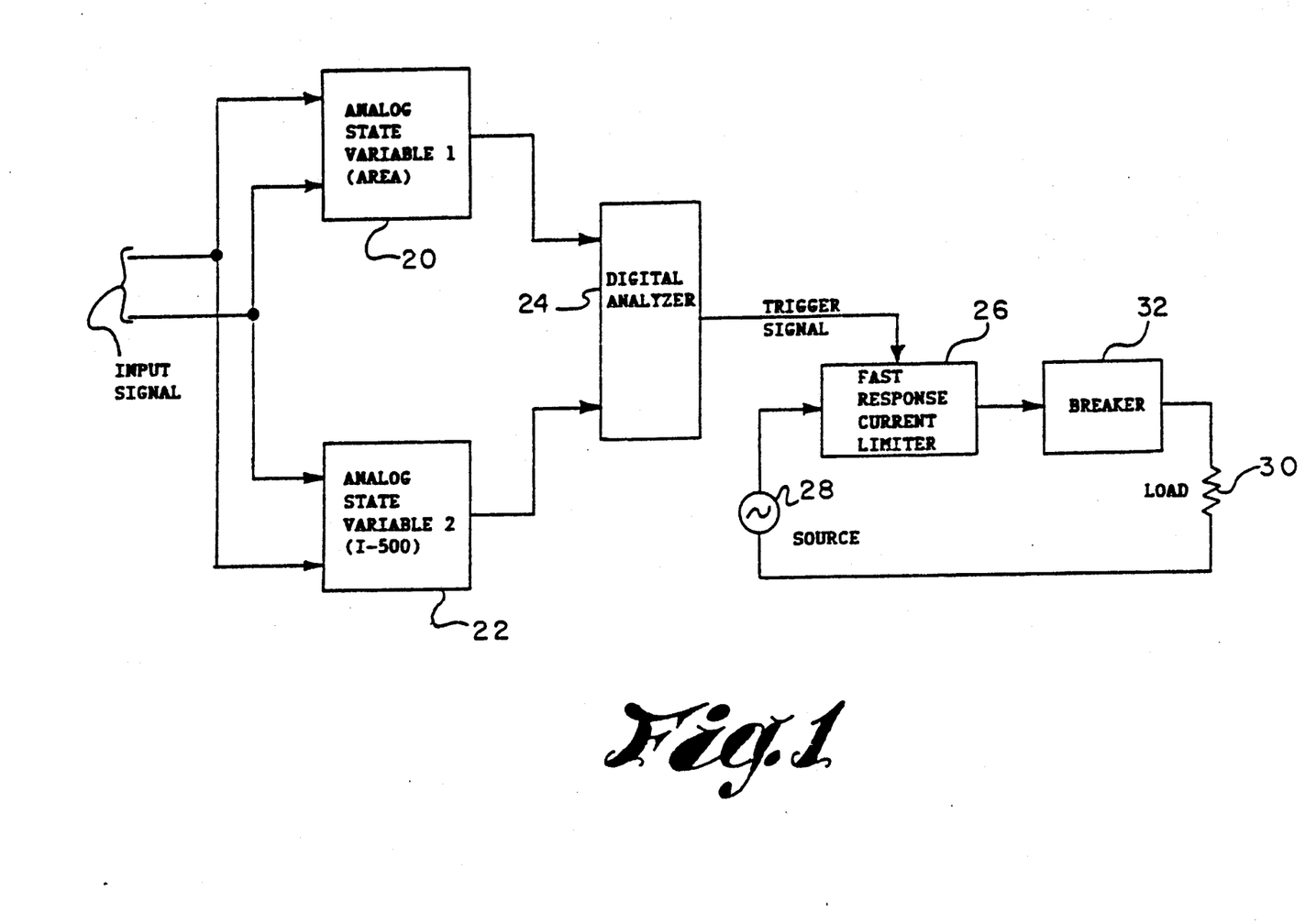
FIG. 1 is a functional block diagram of the invention.

Input signal having a predetermined relationship to the line current of the fast current limiter 26 is coupled to analog circuits which determine two independent state variables. These analog circuits are respectively illustrated at Reference Numerals 20 and 22. The output signals from the state variable calculator circuits, 20 and 22, are coupled to a digital analyzer 24. In response, the digital analyzer 24 produces a trip signal to activate a fast current limiter 26 to limit the line current to a safe value. As is conventional, the fast current limiter 26 is series coupled between a power source 28 and a load 30, using a conventional circuit breaker 32.

As is well known in the art, conventional electromechanical circuit breakers, typically illustrated in reference numeral 32, are not sufficiently fast to protect a conventional electric utility power generator 28, from damages due to very fast current overloads. Thus the fast response limiter 26 is utilized to protect the power generator 28 from such overloads, while the conventional circuit breaker 32 provides protection from other types of overloads.

Figure 2:
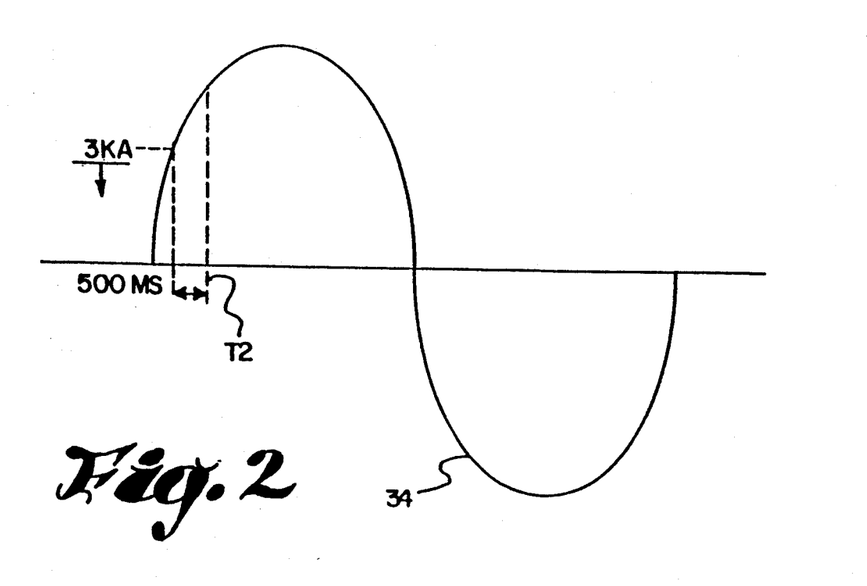
FIG. 2 is a drawing illustrating the integration of the current signal.

FIG. 2 is a diagram illustrating one cycle of a typical AC utility bus line, and the time interval utilized to perform an analysis of overload conditions, in accordance with the invention. More specifically, the line current is integrated over a 500 microsecond interval beginning at a selected current value. Typically, the line current may be either sinusoidal and symmetrical or asymmetrical of any arbitrary shape. That is to say, the calculations performed are not dependent on the line current wave form. For purposes of illustrating the invention, the beginning of the integration is arbitrarily selected as the time when the line current is three kiloamps. Beginning with $T_0$, a signal representing the line current is integrated for 500 microseconds to a point indicated as $T_2$. The signal generated by this integration is further processed and normalized into a signal representing 0 to 5 volts and referred to as an AREA measurement.

Figure 3:
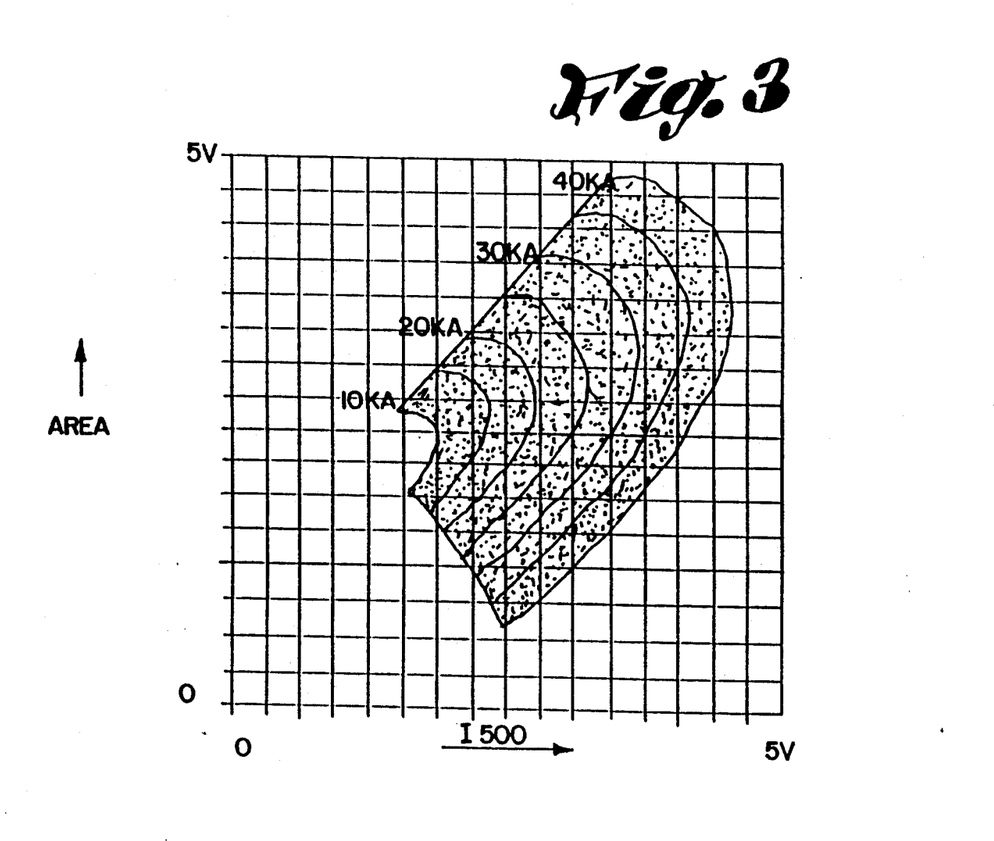
FIG. 3 is a diagram illustrating the trip criteria utilized by the invention.
Figure 4:
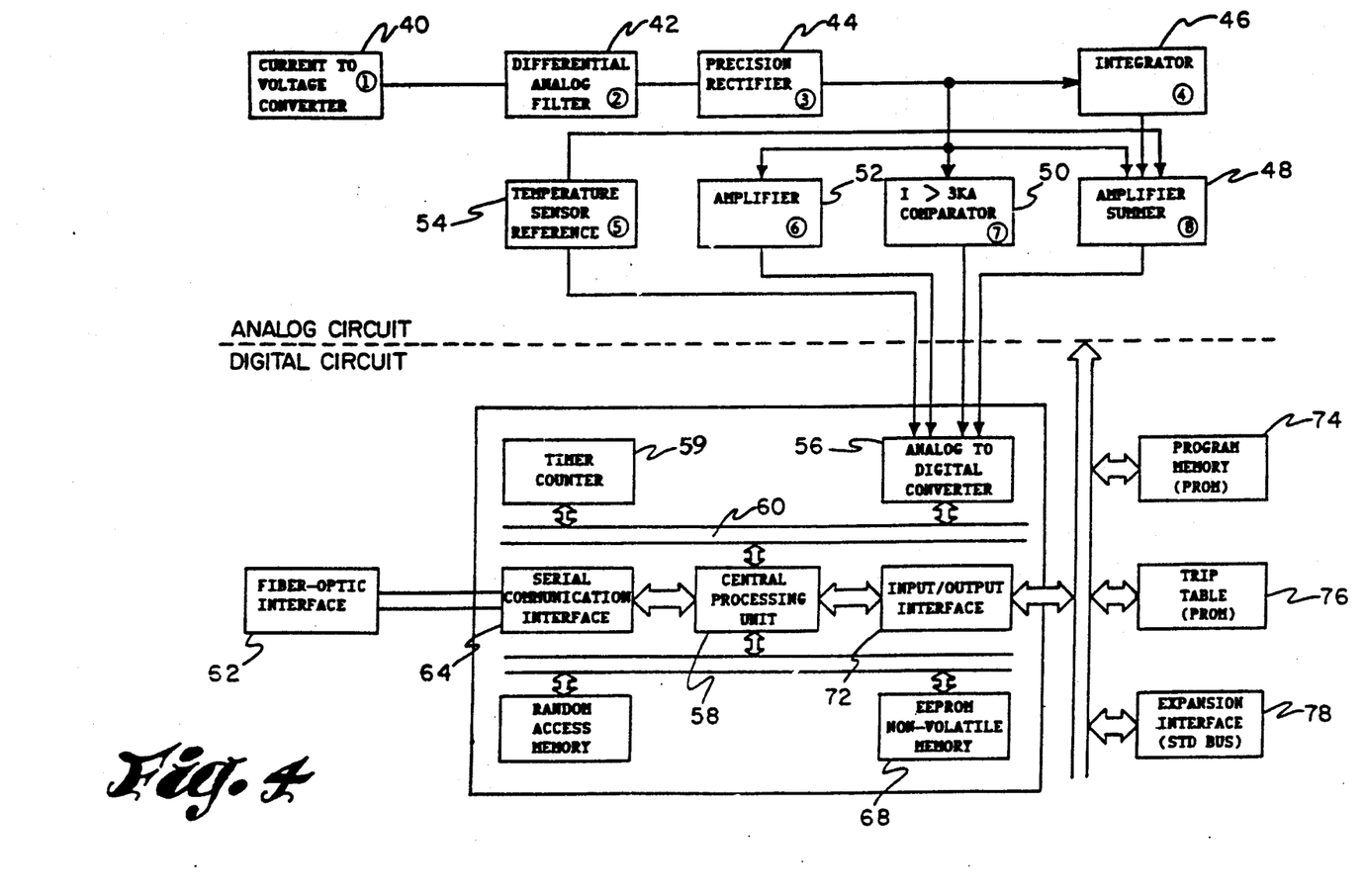
FIG. 4 is a functional diagram illustrating the electronic circuitry utilized in the invention.

This AREA measurement is then plotted with respect to the instantaneous current measurement at the end of the 500 microsecond interval, to determine the equivalent RMS current and decide when the fast response device 26 should be tripped. More specifically, this process is illustrated in FIG. 3 and further described below:

In FIG. 3, the AREA measurement resulting from the line current integration is plotted as a vertical axis. The current measurement for a range of 0 to 15 kiloamps normalized to a 0 to 5 volt range plotted as the horizontal axis. (For convenience the horizontal axis is labeled I500). These values are calculated at the design stage using a computer simulation program and plotted for equivalent RMS currents ranging between 10 and 40 kiloamps and symmetry angles between 0 and 120 degrees. This produces an area which is shaded in FIG. 3. This plot is transformed into a binary table and stored in the digital analyzer 24 memory. At the end of the 500 microsecond integration period, the calculated AREA and measured I500 are looked-up in the table and if their crossing point (or intersection) falls within the shaded area, the fast current limiter 26 is activated to protect the system from damage. Values of current outside this area which exceed safe limits are interrupted by the conventional circuit breaker 32. Circuitry for analyzing the line current signal to produce the trigger signal is illustrated in FIG. 4.

More specifically, a conventional current transformer is utilized to convert the AC line current to an analogue AC voltage signal as functionally illustrated at reference numeral 40. Noise signals are removed by a filter 42 to produce a filtered line current signal which is coupled to the input of a precision rectifier 44. The output of the precision rectifier is a pulsed or full wave rectified replica of the output signal of the current to voltage converter 40. An analogue integrator 46 integrates the output signal of the precision rectifier 44 to produce an analogue signal representing the integral of the line current. The current signal is also coupled to a summer amplifier 48 along with the output of the precision rectifier 44 to produce at the output of this amplifier an AREA signal. The output of the precision rectifier 44 is also coupled to the input of a comparator 50 to generate a signal indicating that the instantaneous current is greater than the preselected value, which in our example is 3KA. Additionally, the output of the precision amplifier is buffered and amplified by a conventional buffer circuit 52. A temperature sensor 54 measures the current temperature. Output signals from the summer amplifier 48, the comparator 50, amplifier 52, and temperature sensor 54, form signals which are coupled as inputs to the analogue to digital converter 56, which comprises a portion of the digital circuitry.

The digital circuitry fundamentally comprises a central processing unit 58, coupled to sufficient memory and interfacing circuitry to perform the data analysis required by the system. More specifically, the central processing unit 58 is coupled to the analogue to digital converter 56 and a timer counter 59 by a conventional data bus 60. Under the control of the central processing unit, the analogue to digital converter 56 samples and converts the magnitude of the analogue signals to digital numbers, which form a data base for determining when the fast current limiting device should be activated. Digital communications with digital systems not specifically comprising a portion of the system, is provided by a fibrotic interface 62 in conjunction with a serial interface circuitry 64.

In performing this assigned task, it is desirable that the central processing unit 54 have access to basic information which should not be lost during power failures or other disturbances as well as some random access memory for data processing. These capabilities are respectively provided by an EEPROM nonvolatile memory 68 and a random access memory 66.

Additionally, the central processing unit 58 has access to other memories through a conventional input, output interface 72. More specifically, conventional programs are stored in a program read only memory 74. Data related to the trip criteria set forth in FIG. 3 is stored in a second read only memory 76 with additional capability to expand the system provided through a auxiliary interface 78.

Figure 5:
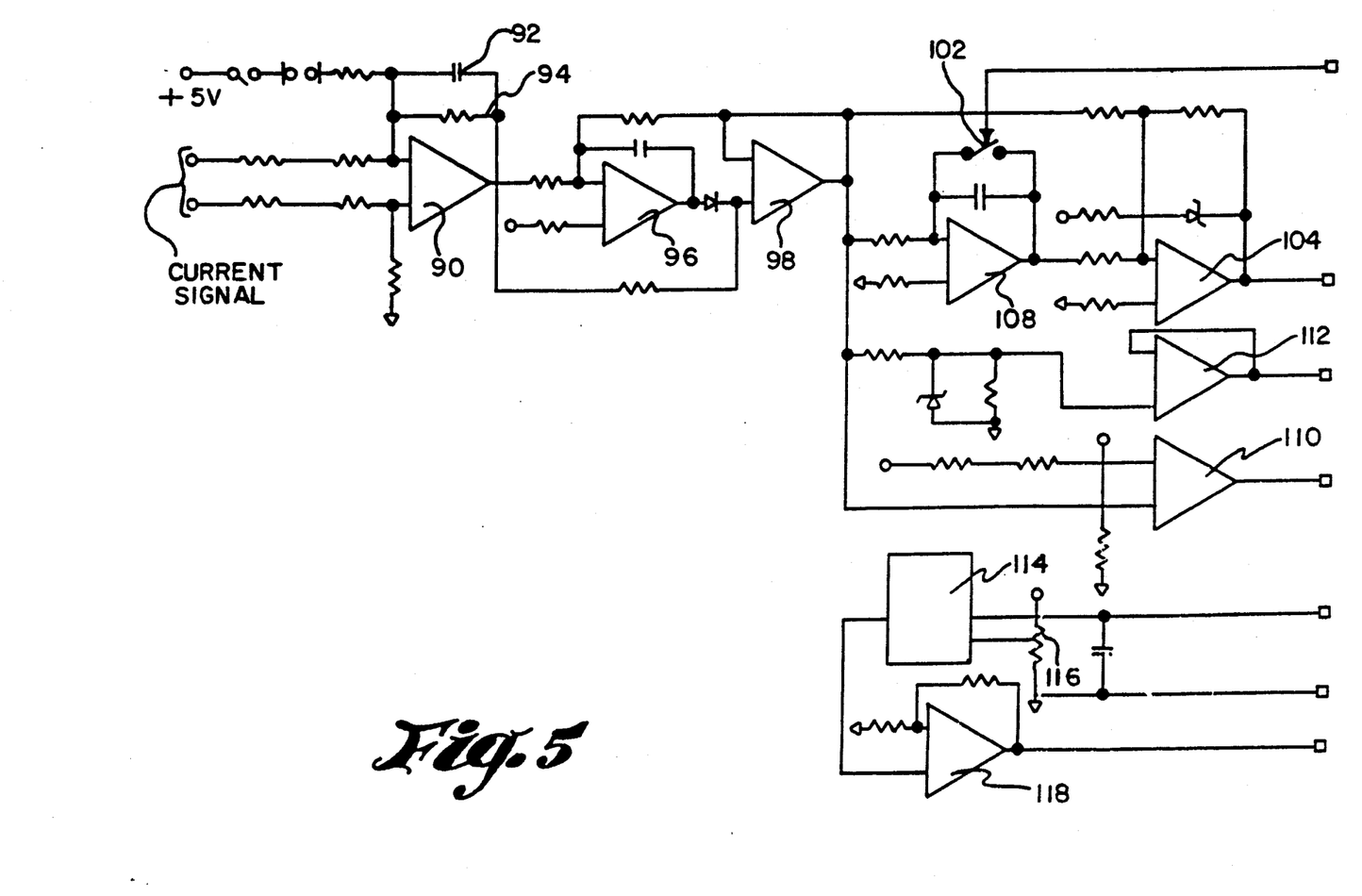
FIGS. 5-8 comprise a detailed schematic diagram of the invention.

FIGS. 5-9 comprise a detailed schematic diagram of the system. More specifically, FIG. 5 is a detailed schematic diagram of the analogue portion of the system for generating the basic data signals utilized by the system. For example, the signal from the conventional current transformers is coupled as an input to an amplifier 90. A feedback circuit around this amplifier, consisting of the parallel combination of a capacitor 92 and a resistor 94, controls the gain of this amplifier and eliminates high frequency noise from the signal. A precision rectifier comprising amplifier 96, 98, and the circuitry associated therewith, produces at the output of amplifier 98 a precise full wave rectified representation of the output signal from amplifier 90.

An integrator comprising amplifier 108 and the circuitry associated therewith integrates the current signal between the two preselected values previously described to produce at the output of this integrator the integrated value of the current. The integration is initiated by opening an electronic switch 102, which holds the gain of the amplifier 100 at zero until the integration starts. The output of the integrator is combined in a summing amplifier 104 to produce at the output thereof the AREA signal in accordance with the following formula.

$$AREA = C1 \int_{T=0}^{T=500} (Idt + C2I + C3)$$

where C1 and C2 are constants

A comparison circuit, including a comparator 110, compares the output of the precision rectifier to a reference voltage to produce the signal indicating that the current exceeds the preselected value of three KA. Additionally, the output of the rectifier is amplified by an amplifier 112.

It is also desirable to utilize precise analog reference signals in the analog calculations described above. These signals are generated by a conventional reference supply 114 with the precise value of the high voltage reference being adjustable by a potentiometer 116. Additionally, the reference generator 114 includes a temperature sensor which produces a temperature signal, which is amplified and buffered by a conventional amplifier 118 to produce a temperature signal.

Figure 6:
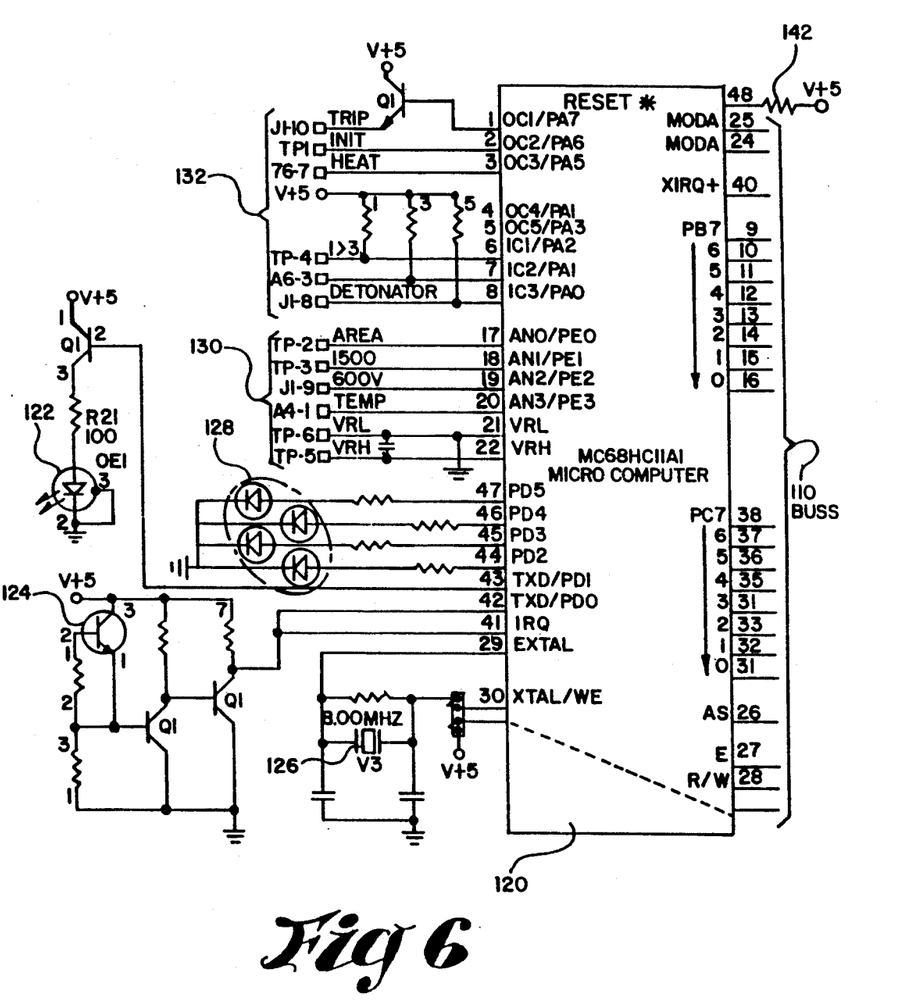

FIG. 6 is a detailed schematic diagram illustrating the microcomputer 120 utilized in the system and the auxiliary circuitry coupled thereto. More specifically, the serial fiber optic interface 64 illustrated in FIG. 4 is provided by an output device comprising a light emitting diode 122 with appropriate drive circuitry and the input portion by an optical transistor 124 and its associated circuitry. As is conventional, the basic clock frequency of the microcomputer 120 is determined by an external crystal 126 and the normal conventional circuitry associated therewith. Operational status of the microcomputer is indicated by four light emitting diodes collectively illustrated at Reference Numeral 128. The specific microcomputer utilized in the invention includes internal analog to digital converters. The various analog output signals from the analog circuitry previously discussed are coupled to the microcomputer 120, as collectively illustrated at Reference Numeral 130. Other analog input signals check the integrity of the detonator, and the amplitude of the three KA comparator. Also, analog output signals, controlling the heater, the start integration switch, and the detonator are coupled to the microcomputer 120 as illustrated at Reference Numeral 132.

Figure 7:
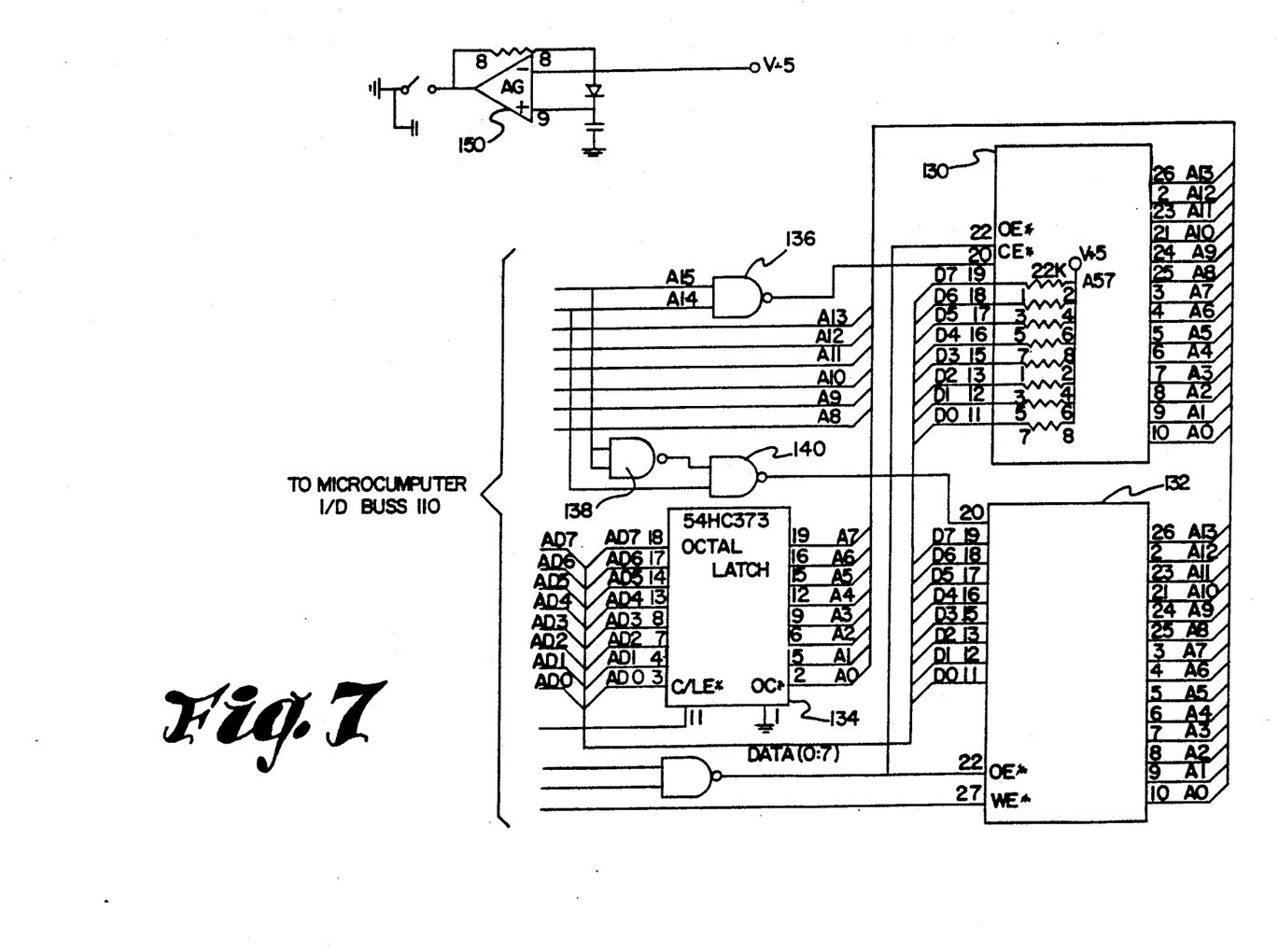

The I/O bus 110 of the microcomputer 120 is coupled to the program memory 130 and the table look-up memory 132 as illustrated in FIG. 7. More specifically, the address portion of the I/O bus is coupled to a data latch 134, permitting the address portion to be separated from the data on the bus. The output of the data latch 134 is coupled to the address input of the memories 130 and 132. Two bits of the data bus are decoded by gates 136 and 138 and 140 to produce signals which either select the program memory 130 or the table look-up memory 132. The data bits of the address bus are coupled as data inputs to these memories.

The +5 volt supply is coupled directly to the microcomputer through a small resistor 142 (shown at the left top corner of the PEC drawing no. 73-330-067-402, R11) to avoid microcomputer latch-up, a common problem with the earlier CMOS devices. A comparator 150 and the circuitry associated therewith generates a recess signal to the micro-computer 120.

Figure 8:
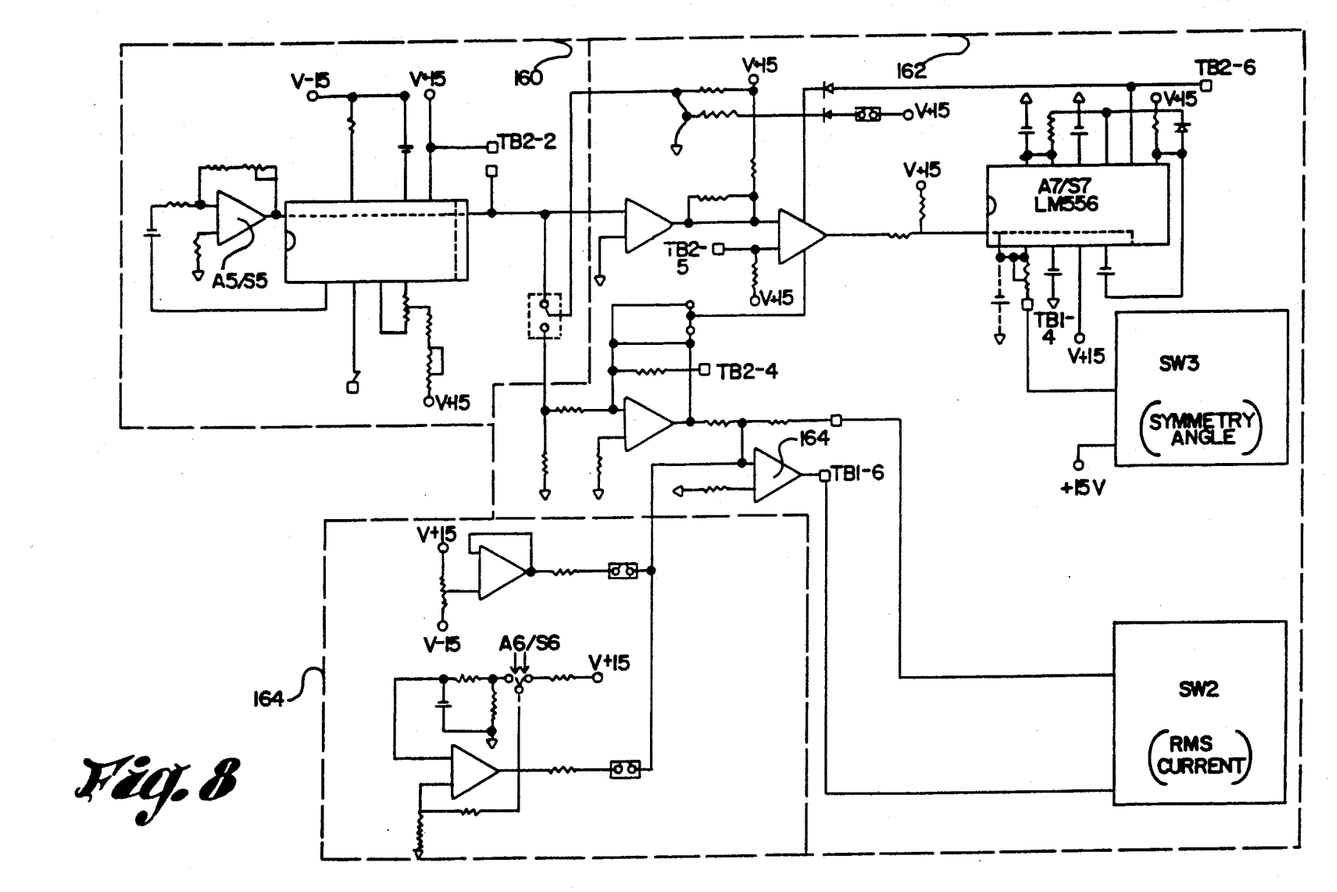

FIG. 8 is a detailed schematic diagram of a test circuit to generate simulated fault current wave forms for testing the system. More specifically, FIG. 8 is a detailed schematic diagram of a test circuit permitting the complete system to be tested using simulated signals. More specifically, a wave form generator 160 can generate basic wave forms, either triangular, sign wave or square wave. These signals are coupled to a simulated fault current generator 162 to generate a simulated fault signal at the output of amplifier 164. A DC offset signal and damped oscillations are added to the simulated current signal by a modification circuit 164. These signals are substituted for the output signal of the current sensor for test purposes.

FIGS. 9-13 are flow charts of the data processing performed by the microcomputer. More specifically, the overall data processing cycle is functionally illustrated in FIG. 9 with the 11 other subroutines illustrated in the remainder of the figures.

Figure 9:
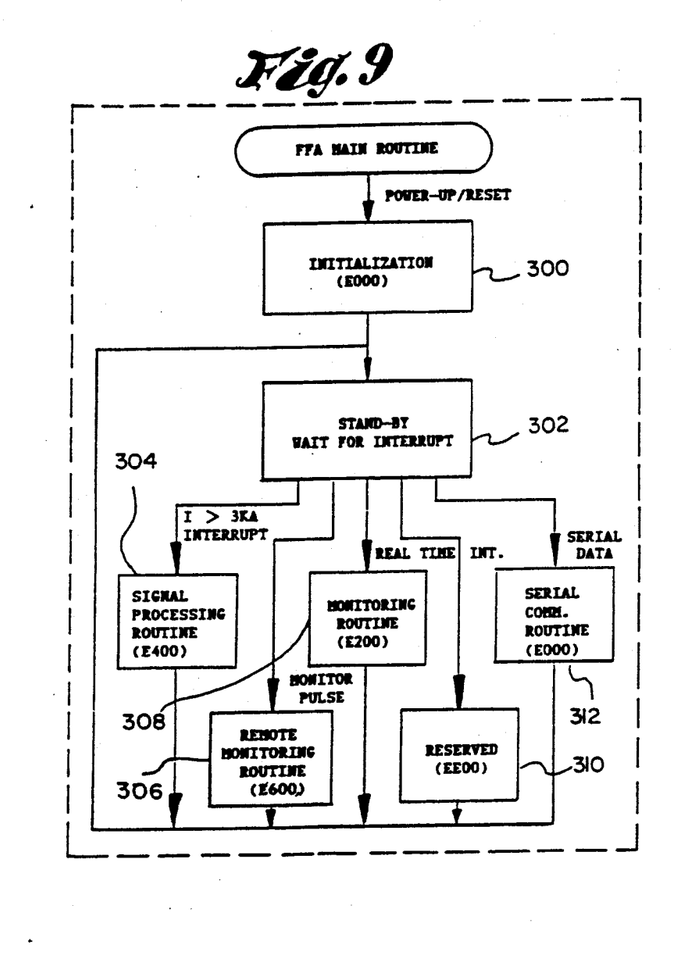
FIGS. 9-13 are flow charts illustrating the software utilized in the invention.

When the system is first turned on the initialization routine illustrated by Reference Numeral 300 is utilized. This routine assures that the digital processor and all the circuits are at a known state. After this is completed, the system proceeds to a stand-by or wait mode as illustrated at Reference Numeral 302. In this state, the system waits for interrupts to indicate that either the signal processing routine, the remote monitoring routine, the monitoring routine, the serial communication routine, or other routines which may be initially initiated. These routines are respectively illustrated at Reference Numerals 304, 306, 308, 310, and 312. Each of these routines are illustrated in more detail in the flow charts to be discussed as follows.

Figure 10:
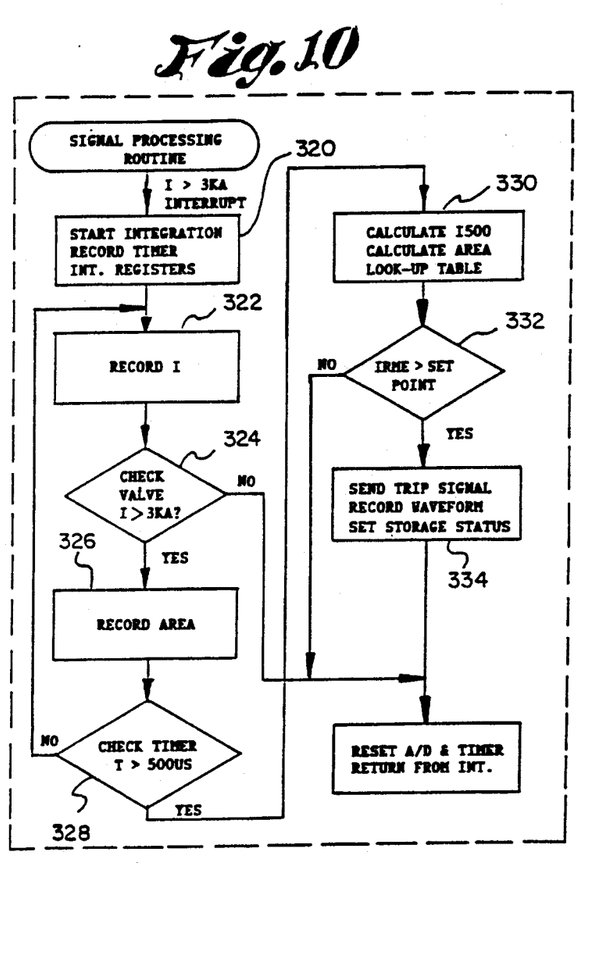

When a current greater than the 3kA threshold is sensed, an interrupt is received to initiate the signal processing routine 104 and a start timer is initialized as illustrated at Reference Numeral 320. This is the timer which times the integration cycle.

Immediately following this interrupt, the value of the current is recorded. This value is checked to see if it is greater than 3KA. If it is greater than 3KA, the area is recorded and routine is repeated. These steps are illustrated at Reference Numerals 322-328.

Conversely, if the current check illustrates that the current is less than the 3kA, the routine terminates by resetting the A/D converter and the timer, and returning to the stand-by mode for the next half cycle. Assuming that the 500 us time period has elapsed, the program calculates the AREA and the current I500 corresponding to the termination of this period and looks up the corresponding value in a look-up table corresponding to FIG. 3. If this look-up indicates a predicted equivalent RMS current exceeding a preset value (i.e. inside the dotted area in FIG. 3), a trip signal is sent. Conversely, if the look-up falls outside of the dotted area, indicating an acceptable fault level or just a transient, the routine is terminated by resetting the device and returning to the stand-by mode. These functions are illustrated at Reference Numerals 330-334.

Figure 11:
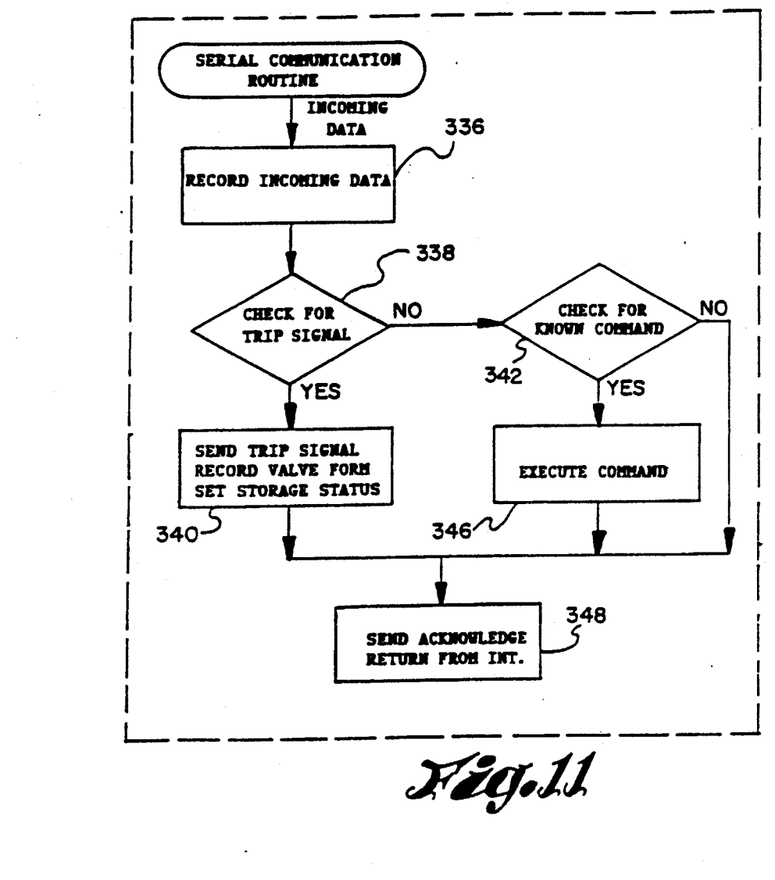

FIG. 11 illustrates the routine for controlling the input of serial information. A first step is to record the information as illustrated at Reference Numerals 336. After the information is recorded, a check is made to see if a trip signal is present. If a trip signal is present, it is given priority and executed with these functional steps illustrated at Reference Numerals 338 and 340. Conversely, if no trip signal is present, a check is made to determine if the signal is known command and if so, it is executed as illustrated at Reference Numerals 342 and 346. If the command is not recognized, an acknowledge signal is sent as functionally illustrated at Reference Numeral 348.

Figure 12:
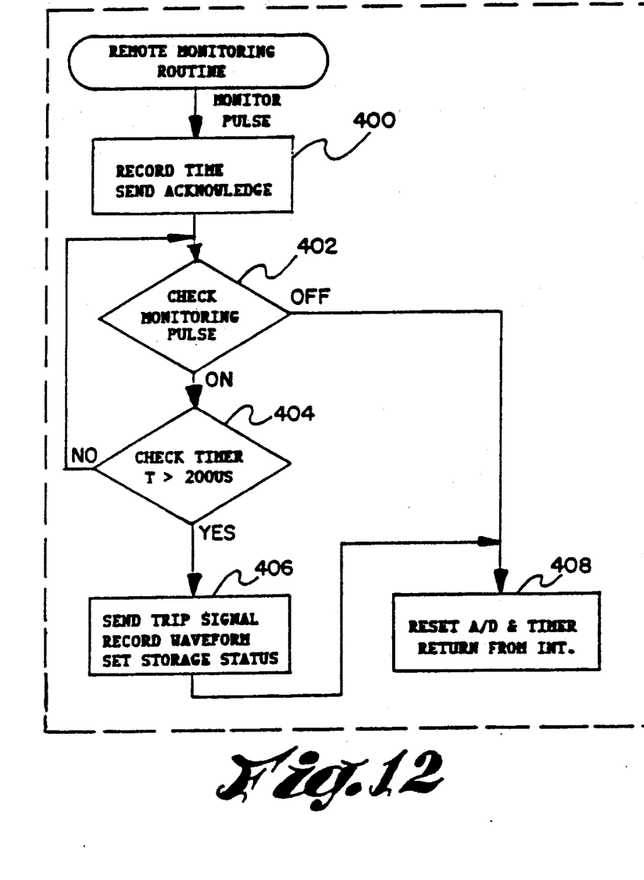

FIG. 12 illustrates a remote monitor routine which is included for checking the integrity of the fiberoptic link. The routine is initialized when a remote monitoring pulse is received and the time of receipt is recorded as illustrated at Reference Numeral 400. The duration of the pulse is checked and when it is turned off, the duration is checked to determine if it is greater than 200 microseconds. If it is greater than 200 microseconds, a trip signal is sent. These steps are functionally illustrated at Reference Numeral 402, 404, and 406. Conversely, if the timer is less than 200 microseconds, the program is returned to the check monitoring pulse cycle 402 and if the pulse is found to be off, the timer is reset and the routine returned to the beginning as illustrated at Reference Numeral 408.

Figure 13:
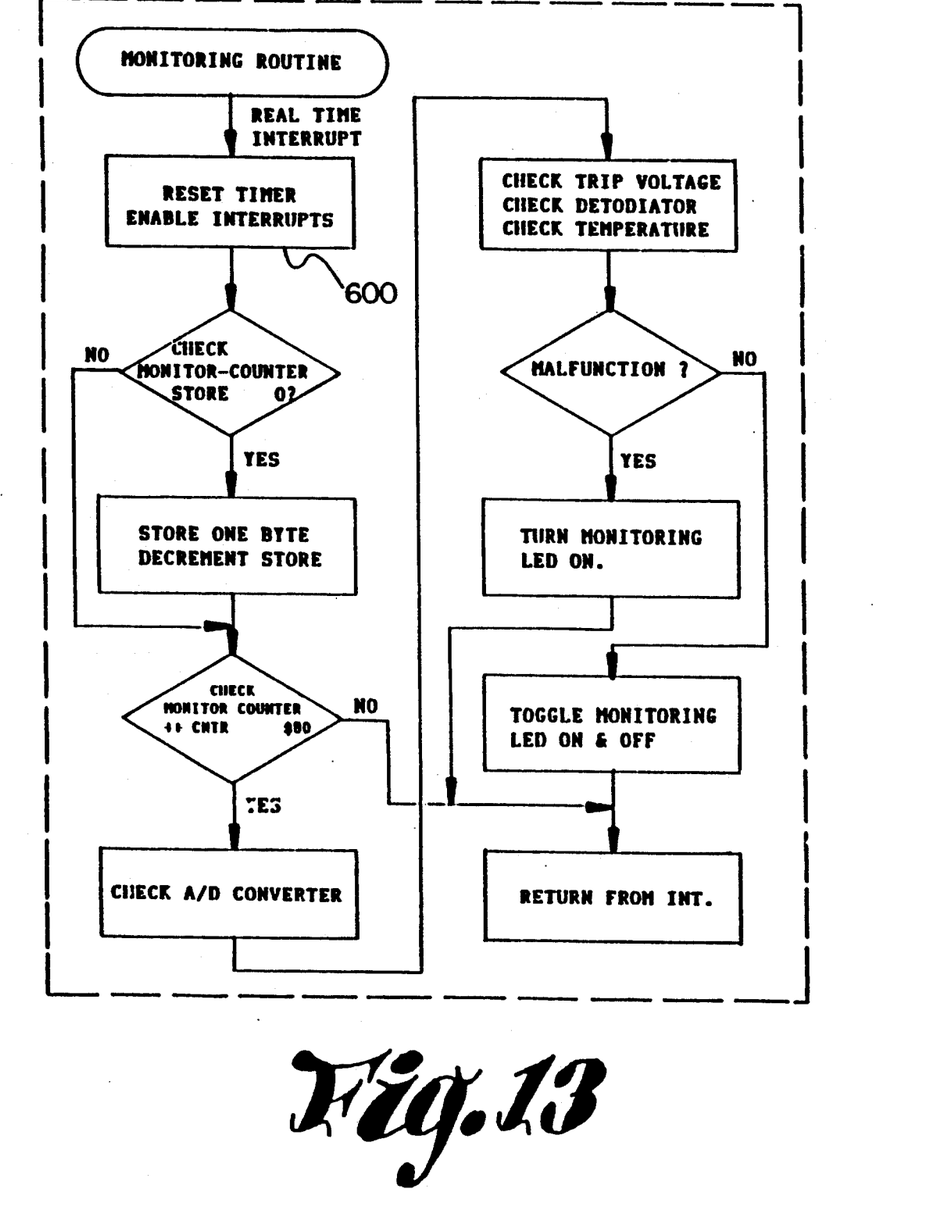

The monitoring routine to determine the integrity of the system is illustrated in FIG. 13. More specifically, a periodic real time interrupt resets the main timer and enables the interrupt, as illustrated at Reference Numeral 600.

I claim:

1. A system coupled to receive a measured AC line current signal produced by a sensor, said measured AC line current signal having a predetermined relationship to the AC current flowing in an electrical circuit and in response thereto selectively generating a signal for initiating a fast interrupt fuse, comprising in combination:
   a) first means for comparing said measured AC line current signal to a reference to generate a start signal when said measured AC line current signal exceeds a preselected value;
   b) second means responsive to said start signal to generate a time interval signal, the beginning of said time interval signal substantially coinciding with the beginning of said start signal;
   c) third means responsive to said time interval signal and said measured current signal to produce an integration signal equal to the integral of said measured AC current signal during the duration of said time interval;
   d) fourth means responsive to said integration signal and the instantaneous AC current flowing in said electrical circuit at the termination of said time interval signal with a predetermined relationship therebetween generating said signal for initiating a fast interrupt fuse.

2. A system responsive to a measured AC line current signal produced by a sensor, said measured AC line current signal having a predetermined relationship to the AC current flowing in an electrical circuit and in response thereto selectively generating a signal for initiating a fast interrupt fuse, comprising in combination:
   a) first circuit means for generating a first signal indicating that said measured AC line current signal has increased to a preselected value;
   b) second circuit means responsive to said first signal to generate a second signal having a predetermined state during a predetermined time interval, the duration of said predetermined time interval being less than one half cycle of said AC line current;
   c) third integration circuit means responsive to said second signal and said measured AC line current signal to generate a third signal having a predetermined relationship to the integral value of said measured AC line current signal during said predetermined time interval; and
   d) fourth circuit means responsive to at least said third signal and to the instantaneous AC current flowing in said electrical circuit to generate said signal for initiating said fast interrupt fuse.

3. A system in accordance with claim 2 wherein said fourth circuit means includes a look-up table for comparing said third signal to said instantaneous AC current flowing in said electrical circuit.

4. A system in accordance with claim 3 wherein said fourth circuit means includes at least a properly programmed digital processor.

* * * * *